(12) United States Patent
Anghel et al.

(10) Patent No.: US 7,227,271 B2
(45) Date of Patent: Jun. 5, 2007

(54) METHOD AND APPARATUS FOR CONTROLLING AN ENGINE START SYSTEM

(75) Inventors: Cristian E. Anghel, Mississauga (CA); Ray M. McGinley, Fountain Hills, AZ (US)

(73) Assignee: Honeywell International Inc., Morris Township, NJ (US)

( * ) Notice: Subject to any disclaimer, the term of this patent is extended or adjusted under 35 U.S.C. 154(b) by 91 days.

(21) Appl. No.: 11/217,357

(22) Filed: Sep. 2, 2005

(65) Prior Publication Data
US 2006/0061336 A1    Mar. 23, 2006

Related U.S. Application Data

(60) Provisional application No. 60/611,304, filed on Sep. 21, 2004.

(51) Int. Cl.
*F02N 11/04* (2006.01)
*H02P 9/00* (2006.01)

(52) U.S. Cl. .................. 290/31; 290/36 R; 322/10

(58) Field of Classification Search .................. 322/10, 322/11, 59, 89, 99; 290/31, 36 R, 37 A
See application file for complete search history.

(56) References Cited

U.S. PATENT DOCUMENTS

| | | | |
|---|---|---|---|
| 3,809,914 A * | 5/1974 | Kilgore et al. | 290/38 R |
| 4,591,775 A * | 5/1986 | Nussel et al. | 318/711 |
| 4,625,160 A * | 11/1986 | Hucker | 322/32 |
| 4,743,777 A * | 5/1988 | Shilling et al. | 290/46 |
| 5,097,195 A | 3/1992 | Raad et al. | |
| 5,428,275 A | 6/1995 | Carr et al. | |
| 5,493,201 A * | 2/1996 | Baker | 322/10 |
| 5,495,127 A | 2/1996 | Aota et al. | |
| 5,512,811 A * | 4/1996 | Latos et al. | 322/10 |
| 5,587,647 A * | 12/1996 | Bansal et al. | 322/45 |
| 5,594,322 A * | 1/1997 | Rozman et al. | 322/10 |
| 6,351,090 B1 | 2/2002 | Boyer et al. | |
| 6,462,429 B1 | 10/2002 | Dhyanchand et al. | |
| 6,847,194 B2 * | 1/2005 | Sarlioglu et al. | 322/10 |
| 6,998,726 B2 * | 2/2006 | Sarlioglu et al. | 290/31 |

* cited by examiner

*Primary Examiner*—Nicholas Ponomarenko
(74) *Attorney, Agent, or Firm*—Birch, Stewart, Kolasch & Birch, LLP

(57) ABSTRACT

An apparatus (80) controls a synchronous machine (20) used to start an engine (300) during an engine start operation. The apparatus comprises: an exciter current control unit (84) for controlling exciter current output to the synchronous machine (20) during the engine start operation; and a main current control unit (82) for controlling main current output to the synchronous machine (20) during the engine start operation as a function of machine speed. In one implementation, the main current control unit (82) controls main current output to the synchronous machine (20) so that the synchronous machine (20) exhibits a reduced output torque during an initial torque application stage. The reduced viscous drag effects and reduced impact torque are beneficial to the engine system (100).

20 Claims, 4 Drawing Sheets

METHOD AND APPARATUS FOR CONTROLLING AN ENGINE START SYSTEM

RELATED APPLICATION

This application claims priority under 35 U.S.C. § 119(e) of Provisional Application No. 60/611,304 filed Sep. 21, 2004, the entire contents of which are herein incorporated by reference.

FIELD OF THE INVENTION

The present invention is related to machine drive systems, and more particularly to a method and an apparatus for controlling an engine start system, e.g., for starting an aircraft engine.

BACKGROUND OF THE INVENTION

A conventional electromechanical system, as utilized for example in the aerospace industry, includes a synchronous machine that generates multi-phase AC power from a rotating shaft, e.g., coupled to a gas turbine engine. In addition to operating in a generator mode, the synchronous machine operates as a starter (motor) to start the aircraft engine. Following a successful engine start, the system initiates the generator mode to supply multi-phase AC power to the aircraft power distribution system. When a synchronous starter-generator is used to start the engine, electrical power from a power source is coupled to the synchronous starter-generator via a main inverter, which supplies regulated AC power to the main stator coil of the machine. At the same time, an exciter inverter supplies single-phase AC power (e.g., at a constant frequency of 400 Hz) to a stator excitation winding of the machine. This produces, through the transformer effect, an electromagnetic field in rotor excitation windings at zero rotational speed. This field induces an AC voltage that is rectified by a rectifier on the rotor to establish a magnetic field in a main rotor winding. The interaction between the flux produced by the magnetic field in the main rotor winding and the stator currents (flux) established in the main stator coil produces torque for starting the engine. The main inverter varies the balanced multi-phase AC power (amplitude, frequency, and phase) output to the main stator coil as a function of rotor speed and position to control torque for the starter-generator.

Using electric starter-generators for aircraft engine start in this manner can save weight and lower operating cost as part of new system architectures. In some recent applications where AC electrical machines are used as starters for an aircraft engine (main or auxiliary power unit), a high starting torque is applied to the gearbox and indirectly to the engine. The impact torque created by electric starters is typically greater than that created by air turbine starters. In some cases, this high starting torque is the sum of the torque produced by multiple, e.g., two, starters. Because of the large torque applied, and the fact that multiple starters are sometimes used on the same gearbox during the engine start, the impact torque on the gearbox will adversely affect gear life.

SUMMARY OF THE INVENTION

In one aspect, the present invention is an apparatus for controlling a synchronous machine used to start an engine during an engine start operation, the apparatus comprising: an exciter current control unit for controlling exciter current output to the synchronous machine during the engine start operation; and a main current control unit for controlling main current output to the synchronous machine during the engine start operation as a function of machine speed. In one embodiment, the main current control unit controls main current output to the synchronous machine so that the synchronous machine exhibits a produced torque during an initial torque application stage that is lower than a produced torque exhibited during a subsequent torque application stage. In another embodiment, the exciter current control unit controls exciter current output to the synchronous machine as a function of speed so that the synchronous machine exhibits a produced torque during an initial torque application stage that is lower than a produced torque exhibited during a subsequent torque application stage.

In another aspect, the present invention is a method for controlling a synchronous machine used to start an engine during an engine start operation, comprising: controlling exciter current output to the synchronous machine during the engine start operation; and controlling main current output to the synchronous machine during the engine start operation. The method controls at least one of main current and exciter current output to the synchronous machine during the engine start operation as a function of machine speed so that the synchronous machine exhibits a produced torque during an initial torque application stage that is lower than a produced torque exhibited during a subsequent torque application stage.

BRIEF DESCRIPTION OF THE DRAWINGS

Additional aspects of the present invention will become apparent upon reading the following Detailed Description and upon reference to the drawings, in which.

DETAILED DESCRIPTION

In one aspect, an embodiment of the present invention relates to an engine start technique (implemented as a method or an apparatus) that achieves sufficient torque during an engine start operation without causing high impact torque on the gearbox, thereby extending gearbox life. In one implementation described below, this technique allows for smooth torque sharing when multiple, e.g., two, starters are used on the same gearbox. This engine start technique is applicable to AC starter-generators and brushless DC motors or any motors where the torque may be regulated by electronic control methods.

Figure 1:
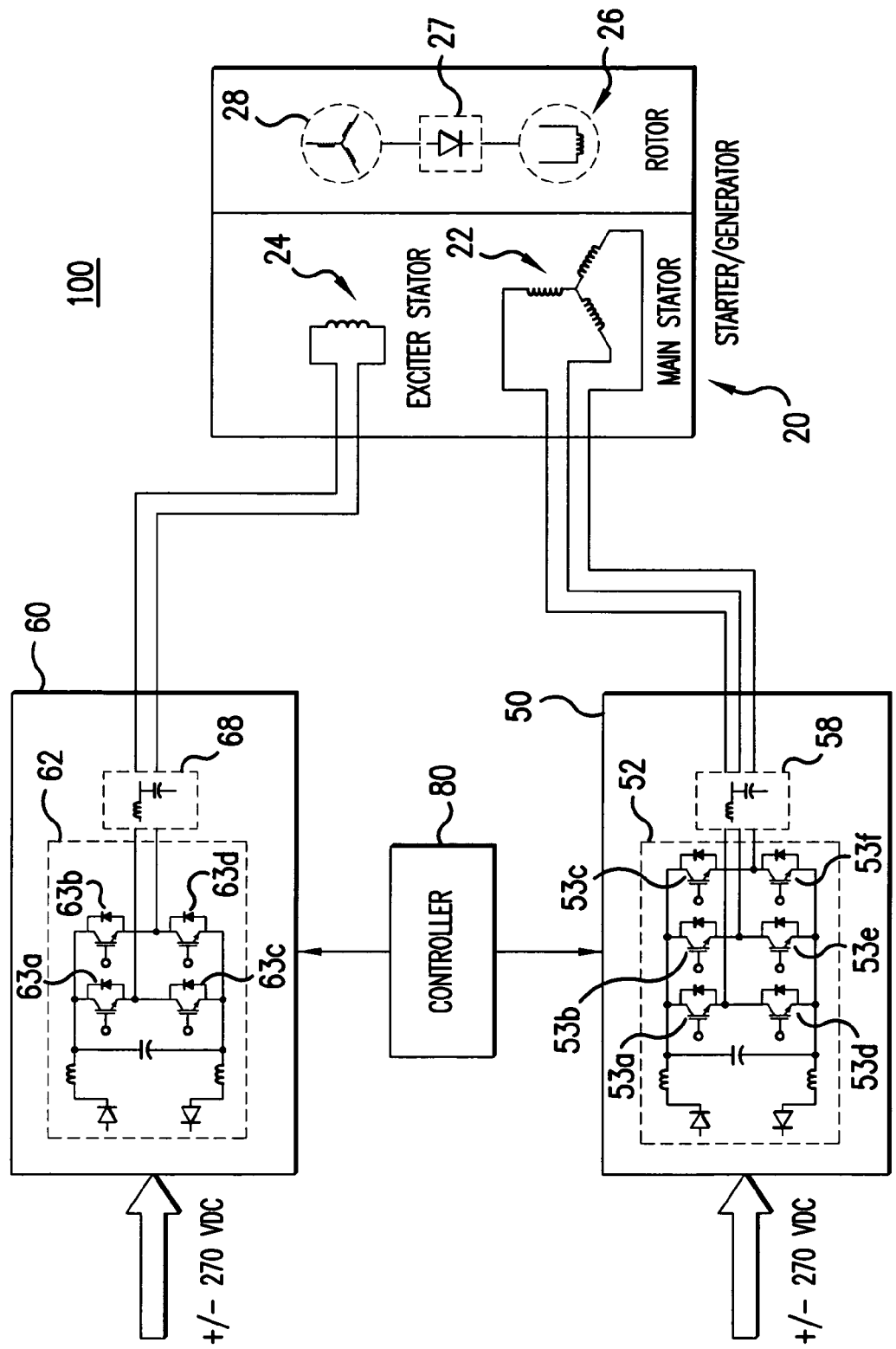
FIG. 1 illustrates an exemplary arrangement for an engine start system to which principles of the present invention may be applied.

FIG. 1 illustrates an engine start system to which principles of the present invention may be applied. As shown in FIG. 1, the engine start system 100 includes: a starter-generator 20; a main inverter 50; an exciter inverter 60; and a controller 80. In this exemplary implementation, the starter-generator 20 is an AC synchronous machine (such as a wound field synchronous motor) having: a stator section with a main stator coil 22 and a stator excitation winding 24; and a rotor section with a main rotor field winding 26, a rotor excitation winding 28, and a rectifier 27 between the rotor excitation winding 28 and the main rotor field winding 26. The rotor section of the starter-generator 20 is mechanically coupled to an engine (e.g., a prime mover of an aircraft turbine engine) via a gearbox.

Although the synchronous machine 20 in the system 100 illustrated in FIG. 1 is a starter-generator, it should be recognized that principles of the present invention described herein are applicable to machines that do not serve as generators.

The controller 80 controls the main inverter 50 to convert DC power (shown in FIG. 1 as 270 VDC, which may be provided on a DC bus) to multi-phase AC power, which is supplied to the main stator coil 22 of the starter-generator 20. The controller 80 regulates the balanced multi-phase AC power output by the main inverter 50 in a manner described below to generate desired torque for accelerating the starter-generator 20 during the start operation. The main inverter 50 includes an inverting section 52 and an output filter 58, connected between the inverting section 52 and the main stator coil 22 of the starter-generator 20. In the embodiment illustrated in FIG. 1, the inverting section 52 utilizes a configuration of insulated bipolar transistors (IGBTs) 53a–53f, which may be switched on/off to create balanced multi-phase AC output using pulse width modulation. It should be recognized that other inverter configurations and switch driving techniques may be used.

During engine start, the controller 80 controls the main inverter 50 to output balanced multi-phase AC power to the main stator coil 22 of the starter-generator 20, creating a rotating magnetic field that interacts with that created in the main rotor field winding 26, such that torque is produced to rotate and start the engine. This torque produced by the starter-generator 20 is applied to the engine via a gearbox, so that the engine achieves a speed capable of self-sustaining operation.

The exciter inverter 60, under control of the controller 80, converts DC power (e.g., 270 VDC from a DC bus) to an AC current (e.g., constant 400 Hz), which is supplied to the stator excitation winding 24. In the embodiment illustrated in FIG. 1, the exciter converter 60 includes an inverting section 62 and an output filter 68. The inverting section 62 utilizes a configuration of IGBTs 63a–63d, which may be switched on/off to convert DC input to single-phase AC output. The resulting electromagnetic field in the rotor excitation winding 28 induces an AC voltage that is rectified by the rectifier 27 and establishes the magnetic field in the main rotor field winding 26.

The torque produced by the starter-generator 20 is a function of the amplitude, frequency, and phase of the balanced multi-phase current supplied by the main inverter 50 (main current) and the current amplitude supplied by the exciter inverter 60 (exciter current). As will be recognized by those of skill in the art, the three-phase main current includes a torque producing component (e.g., active current component (Iq)) and a non-torque producing component (e.g., reactive current component (Id)). During the start operation, the non-torque producing component is minimized (e.g., Id=0), such that the torque producing current component is being controlled to generate desired torque. In one implementation of the present invention, this torque producing current component is controlled using a, b, c (three-phase) current control, without conversion into a d-q (direct-axis, quadrature-axis) domain. It should be recognized, however, that principles of the present invention may be applied to a system in which control is performed in the d-q domain. It should also be recognized that external factors, such as temperature, affect the torque produced. In order to produce controllable torque, the controller 80 requires rotor position information. This rotor position information can be provided using any suitable sensor-based or sensorless technique. An exemplary sensorless technique has been described in U.S. Pat. No. 6,809,496 titled "Position sensor emulator for a synchronous motor/generator" and issued Oct. 26, 2004, which is incorporated herein by reference in its entirety.

Figure 2:
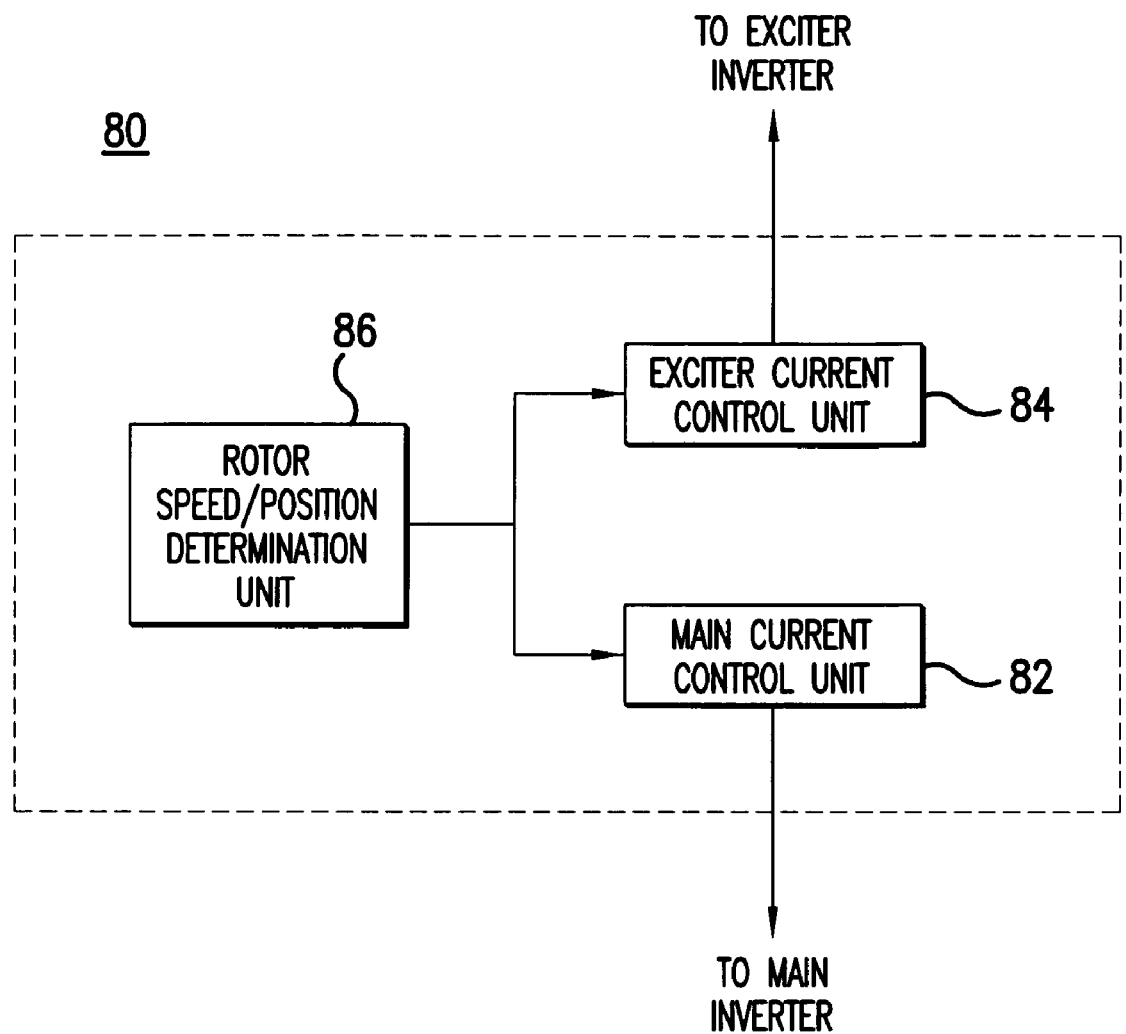
FIG. 2 is a block diagram illustrating an inverter controller according to an embodiment of the present invention.

FIG. 2 is a general block diagram illustrating functional components of the controller 80 in accordance with an embodiment of the present invention. As shown in FIG. 2, the controller 80 includes: a main current control unit 82; an exciter current control unit 84; and a rotor speed/position determination unit 86. The main current control unit 82 controls the main inverter 80 during the engine start operation based on rotor speed information provided by the rotor speed/position determination unit 86 (sensor-based or sensorless-based). The exciter current control unit 84 controls the exciter inverter 60 based on rotor position/speed information provided by the rotor speed/position determination unit 86. Although FIG. 2 illustrates discrete components for main current and excitation current control, this illustration is merely for ease of explanation, and it should be recognized that these functions may be performed by the same physical device and may be implemented using various combinations of software, hardware, application specific integrated circuits (ASICs), etc.

The torque produced by the starter-generator 20 is a function of the multi-phase main current supplied by the main inverter 50 to the main stator coil 22 and excitation current output by the exciter inverter 60 to the rotor excitation winding 28 of the starter-generator 20.

Next, details of an engine start control technique according to an embodiment of the present invention will be described with reference to FIG. 3A. As shown in this FIG. 3A, this embodiment controls main current and exciter current as a function of rotor speed (i.e., according to a current/speed schedule). This embodiment controls current in accordance with multiple torque application stages— shown as stages (A), (B), and (C). During an initial torque application stage (A), main current is ramped linearly from an initial value ($I_{init}$) to a maximum value; exciter current is constant, at a maximum level applied during engine start. In one exemplary implementation, the initial main current value is approximately 66% of the maximum main current supplied during engine start. In contrast, in one known system, the engine start control from zero speed is based on application of a current having the entire value required for producing the starting torque schedule.

During a torque application stage (B), both the main current and exciter current are set at maximum values. At the transition point from torque application stage (A) to torque application stage (B), the stage (B) acceleration is higher than the acceleration during torque application stage (A). During a third torque application stage (C), both main current and exciter current are decreased, until engine start is complete. Exciter current is linearly decreased and main current is decreased on a curve during this torque application stage (C).

Figure 3B:
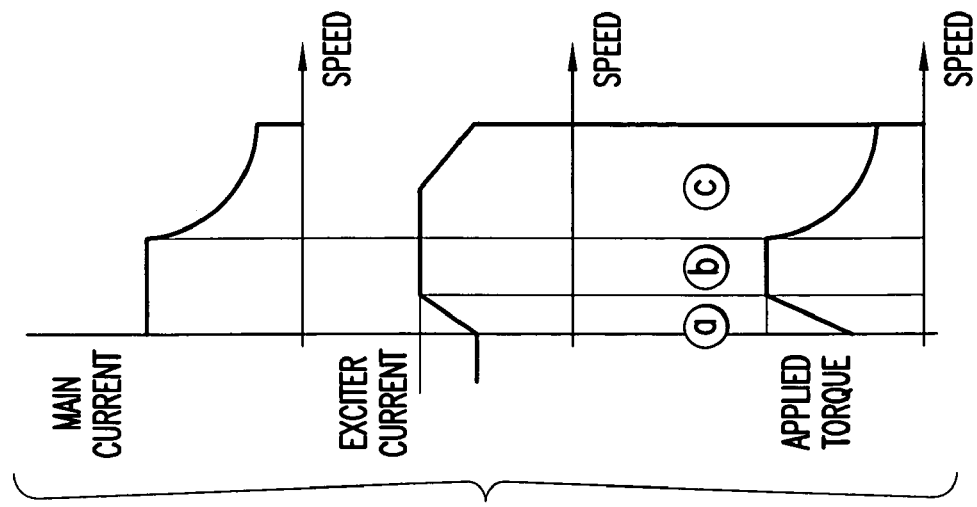
FIG. 3B illustrates exciter current output, main current output, and applied torque as a function of speed during an engine start operation in accordance with another embodiment of the present invention.

FIG. 3B illustrates exciter current output and main current output as a function of speed during an engine start operation in accordance with another embodiment of the present invention. In the embodiment of FIG. 3B, during an initial torque application stage (A), exciter current is linearly ramped from an initial value to a maximum value; main current is held constant at its maximum level applied during engine start. In one exemplary implementation, the initial exciter current value is approximately 66% of the maximum exciter current supplied by the exciter converter 60 during the engine start operation. During a torque application stage (B), both the exciter current and the main current are set at maximum values. At the transition point from torque application stage (A) to a torque application stage (B), the stage (B) acceleration is higher than the acceleration during the torque application stage (A). During a third torque application, stage (C), both the exciter current and the main current are decreased, until engine start is complete. Exciter current is linearly decreased and main current is decreased on a curve during this third torque application stage (C).

Some recent applications have employed use of an initial current schedule that will produce the maximum value torque, resulting in a sudden application of a high impact torque to the gearbox. Most of the engine drag torque, which must be overcome to accelerate the engine from rest, originates from the gearbox driven oil pump. It is known that the magnitude of viscous drag, especially with cold oil, is increased when the applied torque is increased. This is sometimes referred to as the "churning effect." More power is required from the start system to accelerate the engine past the maximum drag torque point. Instead of immediately providing maximum main current at zero speed, the current schedule according to the embodiment illustrated in FIG. 3A is initiated at a certain value higher than the breakaway torque (for example, 66% of maximum) and then linearly ramped to maximum current. The value of the initial current, $I_{init}$, is defined based on the engine and application characteristics. The initial current value, $I_{init}$, is adjustable for various applications (main engine, APU, etc.). This reduces the initial acceleration and slightly reduces the peak viscous drag torque, so that the maximum power required from the start system components is also reduced. This is significant for an electric main engine start since the torque amplitude during start mode is higher than during generate mode and the size and weight of the components will be penalized if the drag torque is unnecessarily high. The impact on the overall performance of the start system to implement the present invention is a slight increase in start time.

Figure 3A:
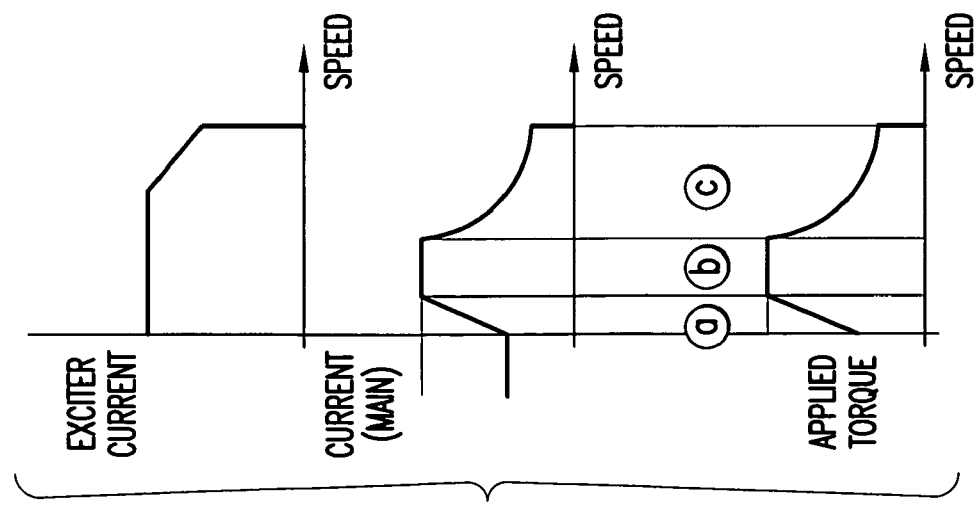
FIG. 3A illustrates exciter current output, main current output, and applied torque as a function of speed during an engine start operation according to an embodiment of the present invention.

In the embodiment illustrated in FIG. 3A, main current is ramped from an initial value to a maximum value during torque application stage (A). In one implementation, the controller 80 increases main current as a function of rotor speed during torque application stage (A). In an alternative implementation, the controller 80 increases main current during torque application stage (A) over a fixed period of time t (e.g., over a period of three seconds). Similarly, in the embodiment of FIG. 3B, the controller 80 increases exciter current as a function of speed or over a fixed period of time t during torque application stage (A).

Figure 4:
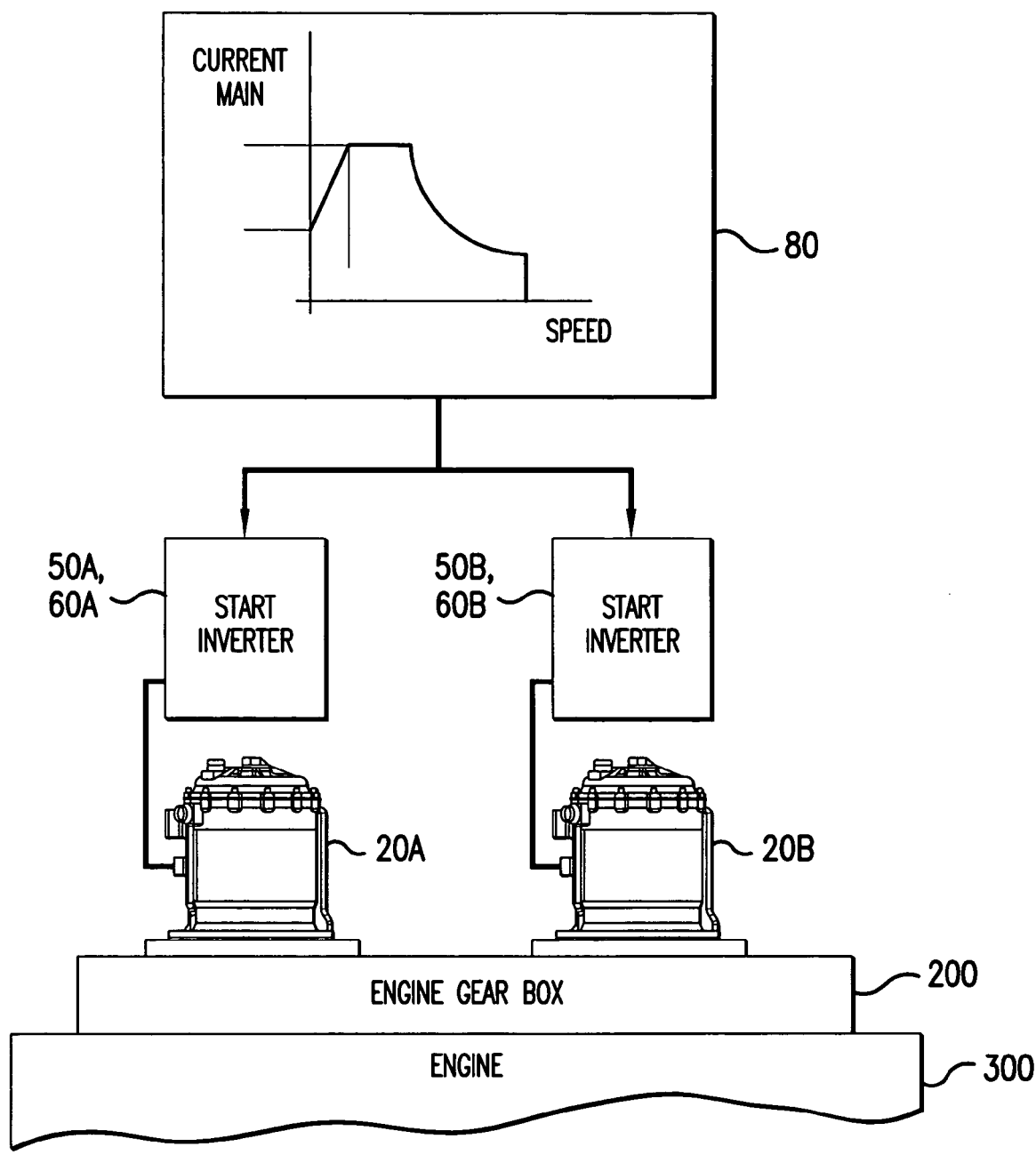
FIG. 4 illustrates a multiple starter arrangement to which principles of the present invention may be applied to achieve engine start.

FIG. 4 illustrates a multiple starter arrangement to which principles of the present invention may be applied to achieve engine start. Although the embodiment illustrated in FIG. 4 applies the current control technique illustrated in FIG. 3A, it should be recognized that the current control technique illustrated in FIG. 3B may also be used in the multiple starter embodiment. In the embodiment of FIG. 4, multiple starter-generators 20A, 20B are coupled to an engine 300 via gearbox 200. Besides the advantages presented above, the disclosed control scheme ensures the addition of the torque produced by two starter-generators 20A, 20B during start as follows: as presented in the above description, the control is based on a current schedule at the output of the start inverters. This strategy results in an overall torque control mode, i.e., the output torque becomes the variable under control. This control mode ensures that the torque produced by the two starter-generators 20A, 20B adds together without torque oscillations or interactions between them. The initial ramp offers the advantage of a smooth application of the torque produced by the two starter-generators 20A, 20B to the gearbox 200, avoiding system damage due to high impact torque.

What is claimed is:

1. An apparatus for controlling a synchronous machine used to start an engine during an engine start operation, said apparatus comprising:
    an exciter current control unit for controlling exciter current output to the synchronous machine during the engine start operation; and
    a main current control unit for controlling main current output to the synchronous machine during the engine start operation as a function of machine speed, wherein said main current control unit controls main current output to the synchronous machine so that the synchronous machine exhibits a produced torque during an initial torque application stage that is lower than a produced torque exhibited during a subsequent torque application stage.

2. The apparatus according to claim 1, wherein said main current control unit controls main current output to the synchronous machine such that:
    main current is increased from an initial value to a maximum value during the initial torque application stage; and
    main current is maintained at its maximum value during the subsequent torque application stage.

3. The apparatus according to claim 2, wherein main current is increased linearly from the initial value during the initial torque application stage.

4. The apparatus according to claim 2, wherein the initial value of main current is non-zero.

5. The apparatus according to claim 4, wherein the initial value of main current is greater than approximately 50% of the maximum value.

6. The apparatus according to claim 2, wherein the subsequent torque application stage is a second torque application stage, and said main current control unit controls main current output to the synchronous machine such that:
    main current is decreased from the maximum value during a third torque application stage.

7. The apparatus according to claim 1, wherein said apparatus controls multiple synchronous machines used to start the same engine during the engine start operation, said multiple synchronous machines being mechanically coupled to the same gearbox.

8. The apparatus according to claim 1, wherein said main current control unit controls a main inverter, which converts DC electrical power to multi-phase AC electrical power, which the main inverter outputs to a main stator winding of the synchronous machine.

9. The apparatus according to claim 1, wherein the engine is a gas turbine engine of an aircraft.

10. An apparatus for controlling a synchronous machine used to start an engine during an engine start operation, said apparatus comprising:

a main current control unit for controlling main current output to the synchronous machine during the engine start operation; and an exciter current control unit for controlling exciter current output to the synchronous machine during the engine start operation as a function of machine speed, wherein said exciter current control unit controls exciter current output to the synchronous machine so that the synchronous machine exhibits a produced torque during an initial torque application stage that is lower than a produced torque exhibited during a subsequent torque application stage.

11. The apparatus according to claim 10, wherein said exciter current control unit controls exciter current output to the synchronous machine such that:

exciter current is increased from an initial value to a maximum value during the initial torque application stage; and exciter current is maintained at its maximum value during the subsequent torque application stage.

12. The apparatus according to claim 11, wherein exciter current is increased linearly from the initial value during the initial torque application stage, wherein the initial value is non-zero.

13. The apparatus according to claim 11, wherein the subsequent torque application stage is a second torque application stage, and said exciter current control unit controls exciter current output to the synchronous machine such that:

exciter current is decreased from the maximum value during a third torque application stage.

14. The apparatus according to 10, wherein said apparatus controls multiple synchronous machines used to start the same engine during the engine start operation, said multiple synchronous machines being mechanically coupled to the same gearbox.

15. A method for controlling a synchronous machine used to start an engine during an engine start operation, said method comprising:

controlling exciter current output to the synchronous machine during the engine start operation; and controlling main current output to the synchronous machine during the engine start operation, wherein said method controls at least one of main current and exciter current output to the synchronous machine during the engine start operation as a function of machine speed so that the synchronous machine exhibits produced torque during an initial torque application stage that is lower than a produced torque exhibited during a subsequent torque application stage.

16. The method according to claim 15, wherein main current output to the synchronous machine is controlled such that:

main current is increased from an initial, non-zero, value to a maximum value during the initial torque application stage;

main current is maintained at its maximum value during the subsequent torque application stage, which is a second torque application stage; and main current is decreased from the maximum value during a third torque application stage.

17. The method according to claim 15, wherein exciter current output to the synchronous machine is controlled such that:

exciter current is increased from an initial, non-zero, value to a maximum value during the initial torque application stage;

exciter current is maintained at its maximum value during the subsequent torque application stage, which is a second torque application stage; and exciter current is decreased from the maximum value during a third torque application stage.

18. The method according to claim 15, wherein said method controls multiple synchronous machines used to start the same engine during an engine start operation, said multiple synchronous machines being mechanically coupled to the same gearbox.

19. The method according to claim 15, wherein said step of controlling main current output to the synchronous machine controls a main inverter, which converts DC electrical power to multi-phase AC electrical power, which the main inverter outputs to a main stator winding of the synchronous machine; and said step of controlling exciter current output to the synchronous machine controls an exciter inverter, which converts DC electrical power to AC electrical power, which the exciter inverter outputs to a stator excitation winding of the synchronous machine.

20. The method according to claim 15, wherein the engine is a gas turbine engine of an aircraft.

* * * * *